United States Patent [19]

Hammoud et al.

[11] Patent Number: 5,669,679
[45] Date of Patent: Sep. 23, 1997

[54] BRAKE SYSTEM CONTROL

[75] Inventors: Michael Wajih Hammoud, Woodhaven; Daniel Andrew Nagy, Farmington Hills; Chris-Ann Paterson, Highland, all of Mich.

[73] Assignees: General Motors Corporation, Detroit, Mich.; Delco Electronics Corp., Kokomo, Ind.

[21] Appl. No.: 610,036

[22] Filed: Mar. 4, 1996

[51] Int. Cl.⁶ .................................................... B60T 8/66
[52] U.S. Cl. .................................................... 303/165; 303/163
[58] Field of Search .................................. 303/146, 154, 303/163, 164, 165, 174; 364/426.02

[56] References Cited

U.S. PATENT DOCUMENTS

| | | | |
|---|---|---|---|
| 5,136,509 | 8/1992 | van Zanten et al. | 303/174 X |
| 5,140,524 | 8/1992 | Matsuda | 303/146 X |
| 5,210,690 | 5/1993 | Kageyama et al. | 303/163 X |
| 5,246,278 | 9/1993 | Yoshino et al. | 303/163 |
| 5,474,368 | 12/1995 | Sano | 303/163 |
| 5,577,812 | 11/1996 | Hirano et al. | 303/165 X |

FOREIGN PATENT DOCUMENTS

| | | |
|---|---|---|
| 42 17 710 A1 | 12/1993 | Germany . |
| 42 18 034 A1 | 12/1993 | Germany . |

*Primary Examiner*—Josie Ballato

[57] ABSTRACT

A brake system control for use in a vehicle that calculates a wheel slip for at least one wheel, wherein the brake system control comprises the steps of: monitoring the calculated wheel slip; imposing a discriminating criteria on the monitored wheel slip wherein the discriminating criteria determines whether or not the calculated wheel slip accurately reflects an actual operating condition of the wheel; implementing ABS control using an adjusted wheel slip for the wheel when the discriminating condition determines that the calculated wheel slip does not accurately reflect an actual operating condition of the wheel; and implementing ABS control utilizing the calculated wheel slip when the discriminating condition determines that the calculated wheel slip accurately reflects an actual operating condition of the wheel.

7 Claims, 4 Drawing Sheets

5,669,679

BRAKE SYSTEM CONTROL

This invention relates to a brake system control.

BACKGROUND OF THE INVENTION

In a known manner, anti-lock brake systems (ABS systems) impose anti-lock brake control on each vehicle wheel based on a wheel slip calculated for that wheel in response to sensed wheel speed signals. In a known manner, the wheel slip is used to determine when a particular wheel enters and exits ABS control and when pressure is applied and released to the wheel during cycling of an ABS event.

SUMMARY OF THE PRESENT INVENTION

It is an object of this invention to provide a brake system control in accordance with claim 1.

Advantageously, this invention provides a brake system control apparatus and method for monitoring and adjusting wheel slip for a vehicle wheel.

Advantageously, this invention provides a brake system control that provides ABS operation responsive to an adjusted wheel slip if a calculated wheel slip meets a discriminating criteria.

Advantageously, in an example implementation of this invention, a brake system control is provided in a vehicle that calculates wheel slip for a road wheel for use in brake control according to the steps of monitoring the calculated wheel slip, imposing a discriminating criteria on the wheel slip wherein the discriminating criteria determines whether or not the wheel slip calculated accurately reflects an actual operating condition of the vehicle wheel. If the discriminating condition determines that a wheel slip adjustment is necessary, ABS control is implemented using an adjusted wheel slip for the wheel, otherwise the ABS control is implemented utilizing the calculated wheel slip.

In an advantage provided by the method according to this invention, the discriminating criteria is imposed on the wheel slip as a series of one or more tests that the calculated wheel slip and/or other wheel parameters must pass wherein failure of any one of the plurality of tests determines that the wheel slip is to be adjusted according to this invention.

In a preferred example according to this invention, wheel slip is monitored during cycling of an ABS event in which brake pressure is released and applied. If the minimum wheel slip during the release and apply is greater than a first predetermined threshold and if the minimum wheel acceleration during the release and apply is greater than a second predetermined threshold, then the wheel slip value used during the ABS pressure release and apply control is adjusted.

In another preferred example according to this invention, wheel slip is monitored during an ABS event and is compared to a first predetermined threshold and wheel acceleration is monitored and compared to second and third predetermined thresholds. If the wheel slip is above the first predetermined threshold for a predetermined time period and if the wheel acceleration is between the second and third thresholds, indicating that the vehicle is in a cornering maneuver, then the wheel slip value used during the ABS pressure release and apply control is adjusted.

BRIEF DESCRIPTION OF THE DRAWINGS

The present invention will now be described with reference to the accompanying drawings, in which.

DETAILED DESCRIPTION OF THE INVENTION

Figure 1:
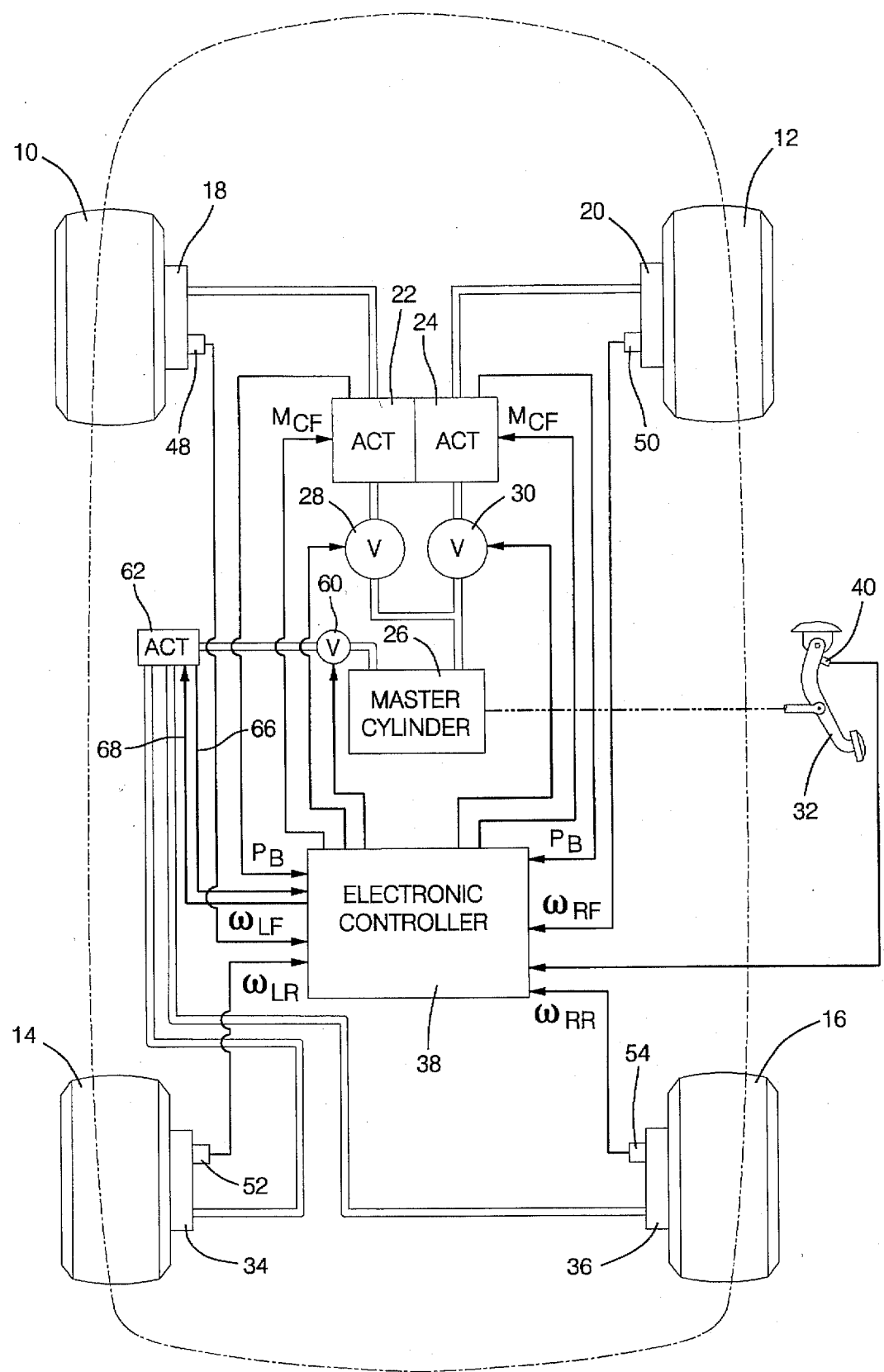
FIG. 1 illustrates an example schematic of a vehicle employing the present invention.

Referring to FIG. 1, the example vehicle braking system illustrated includes left and right front driven wheels 10 and 12 and left and right rear non-driven wheels 14 and 16. The front and rear wheels 10, 12, 14 and 16 have respective hydraulic actuated brakes 18, 20, 34 and 36 actuated by hydraulic pressure generated, during ABS operation and/or yaw control, if desired, via respective actuators 22, 24 and 62 (for both rear brakes 34 and 36). Each of the hydraulic brakes 18, 20, 34 and 36 are further hydraulically coupled to a conventional master cylinder 26 through respective normally opened electromagnetic valves 28, 30 and 60. The hydraulic brakes 18, 20, 34 and 36 are actuated by operator depression of the brake pedal 32, which, vis-à-vis master cylinder 26, increases the hydraulic pressure to the front and rear brakes 18, 29, 34 and 36.

Actuators 22, 24, 62 include a working chamber hydraulically coupled to master cylinder 26, wheel brakes 18, 20, 34 and 36 and valves 28, 30 and 60. In the preferred form of the invention, the actuators 22, 24 and 62 each take the form of a brush or brushless dc motor driven actuator wherein a motor is operated to control a piston vis-à-vis a rotary to linear converter for regulating the braking pressure (the motor for actuator 62 drives two pistons in parallel, one for each rear brake 34, 36). During ABS operation, the brake torque is established at each brake 18, 20, 34, 36 at a value proportional to the position of each actuator piston and is reflected through the torque output of the respective motor. Example brake actuators 22, 24, 62 are well known to those skilled in the art.

The master cylinder 26 is operated by a conventional vehicle brake pedal 32 in response to the foot pressure applied by the vehicle operator.

Electronic controller 38 controls the operation of the actuators 22, 24 and 62 and generally includes a microprocessor with read-only and random-access memory and appropriate input/output interface circuits for interfacing with the various signal input devices and the actuators 22, 24 and 62. Design and construction of appropriate controllers is well known to those skilled in the art.

During brake operation, the front and rear brakes 18, 20, 34 and 36 are operated to establish desired braking torque responsive to operator depression of brake pedal 32 and the resulting hydraulic pressure transferred to the brakes from master cylinder 26. Brake pedal switch 40 provides a signal to electronic controller 38, indicating that the brake pedal is depressed. When the brake pedal is depressed, the electronic controller 38 monitors the speeds of the wheels 10, 12, 14 and 16 through the signals received from wheel speed sensors 48, 50, 52 and 54. In a conventional ABS control, the controller 38 determines when the sensed wheel speeds from sensors 48, 50, 52 and 54 indicates that any of the wheels 10, 12, 14 and 16 are in an incipient lock-up condition. In general, the controller processes the sensor signals as follows.

In a known manner, the wheel speed sensors 48, 50, 52 and 54 provide a pulse train signal to the controller in response to the passing of wheel speed sensor exciter ring teeth (not shown) past the sensors. Such exciter rings are well known to those skilled in the art. As a particular wheel rotates faster, the pulses from the wheel speed sensor for that wheel increase in frequency and, conversely, as the wheel rotates slower, the pulses decrease in frequency. The controller 38 keeps track of the time between pulses and computes the wheel speed therefrom, for example using a look-up table or standard conversion calculation based on filtered pulse periods. The controller differentiates the wheel speed signals to determine the wheel accelerations.

For each wheel, a wheel slip is determined according to:

$$Wheel\ Slip=(EVRV-WS)/EVRV,$$

where EVRV is the estimated vehicle reference velocity and WS is the wheel speed calculated for that particular wheel. The estimated vehicle reference velocity may be determined according to any manner known to those skilled in the art, for example, as an average of the four vehicle wheel speeds.

The controller determines whether an incipient lock-up condition exists for a particular wheel in a known manner based on wheel speed and, in some cases, based on other parameters. If an incipient lock-up condition is detected, the controller, in a known manner in connection with the improvements described herein, controls actuators 22, 24 and 26, commanding the actuators to release and apply hydraulic pressure from and to those of the wheel brakes 18, 20, 34 and 36 for which the incipient wheel lock-up condition is detected, performing a known ABS control function. During ABS operation, the controller 38 sends a signal to the valve or valves 28, 30, 60 corresponding to the wheel or wheels in anti-lock brake control, closing the valve, and isolating the driver pedal 32 from the feel of pulsations of the brake. In some known motor driven actuator implementations, actuators 22, 24 and 26 automatically perform the function of valves 28, 30 and 60, in which case the valves are omitted. In other implementations, a designer may prefer that the driver pedal 32 not be isolated from the feel of pulsations of the brake, in which case also the valves 28, 30 and 60 are omitted. During the ABS control, feedback to the controller 38 is provided by wheel speed sensors 48, 50, 52 and 54.

While in the above example, the brake actuators 22, 24 and 62 are described as reciprocating piston actuators, in another example, brake actuators 22, 24 and 62 are implemented as a set of solenoid valves for selectively coupling wheel brakes 18, 20, 34 and 36 to a source of pressurized hydraulic fluid to increase hydraulic brake pressure and for selectively coupling the wheel brakes to a brake fluid reservoir to decrease hydraulic brake pressure. Implementation of such solenoid valve systems is well known to those skilled in the art. It will be understood by those skilled in the art that the brake system hardware for use with this invention is not limited to the examples given and that this invention may be implemented with any known or new brake system hardware capable of implementing ABS controls, including drive-by-wire systems.

Figure 2:
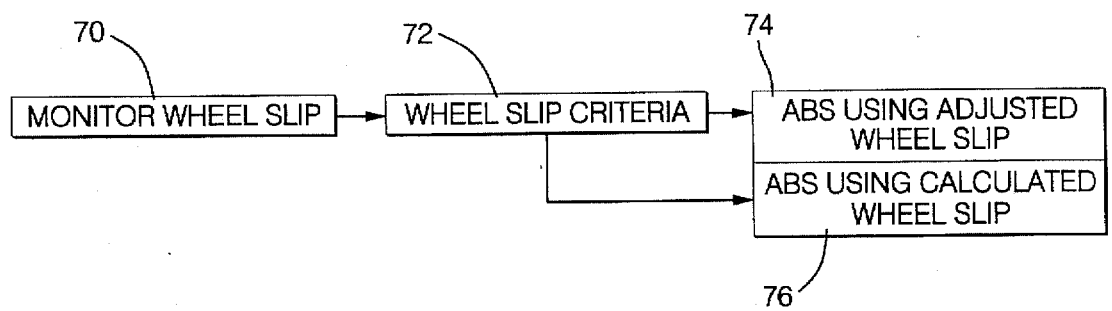
FIG. 2 illustrates an example method according to this invention.

Referring now also to FIG. 2, the brake control implemented by controller 38 according to this invention is shown schematically. At block 70, the electronic controller 38 monitors the wheel slip for each vehicle wheel 10, 12, 14 and 16. The monitoring of the wheel slip for each wheel can be implemented according to any one or more of the following three examples: (a) calculating the raw wheel slip and raw wheel acceleration as known in the prior art; (b) tracking the raw wheel slip over time, as in through a low pass filter, to determine if there is a steady state wheel slip; and (c) tracking the minimum wheel slip and wheel acceleration during each release and apply cycle during an ABS wheel event. For purposes of this discussion, the phrase "raw wheel slip" means the wheel slip calculated in a known manner, such as described above.

Block 72 imposes a discriminating criteria on the wheel slip for each wheel to determine if an adjustment according to this invention is desired. The discriminating criteria may be implemented by any one or more of the following examples. The first example is comparing the raw wheel slip to a predetermined threshold and the raw wheel acceleration to upper and lower bounds, wherein if the raw wheel slip is over the predetermined threshold for a predetermined time period and if the raw wheel acceleration is within the upper and lower bounds for a predetermined time period, the discriminating criteria determines that the computed wheel slip is effected by a vehicle cornering maneuver and an adjustment to the computed wheel slip is desired. The second example determines that an adjustment to the computed wheel slip is desired if a steady state wheel slip exists while wheel acceleration is positive. The third example determines that an adjustment to the computed wheel slip is desired if the minimum wheel slip and minimum wheel acceleration from the immediately previous ABS release and apply cycle are greater than separate wheel slip and acceleration thresholds.

If the discriminating criteria imposed at block 72 does not indicate that a wheel slip adjustment is desired, the ABS control is implemented at block 76 in a conventional manner. If the discriminating criteria imposed at block 72 indicates that a wheel slip adjustment is desired, then block 74 implements the ABS control using, for that particular wheel, an adjusted wheel slip value according to this invention.

Figure 3:
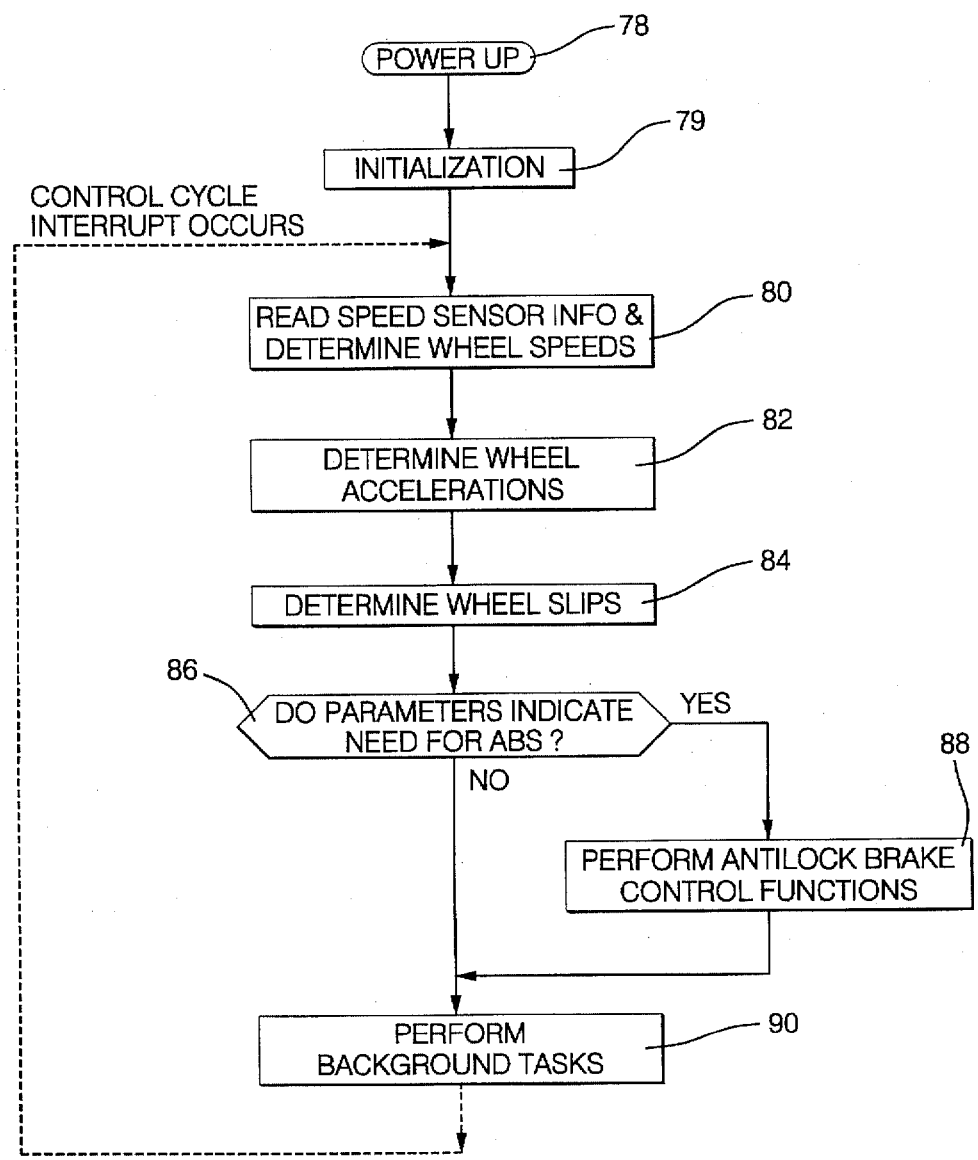
FIGS. 3–5 illustrate example computer flow diagrams for implementing this invention.
Figure 4:
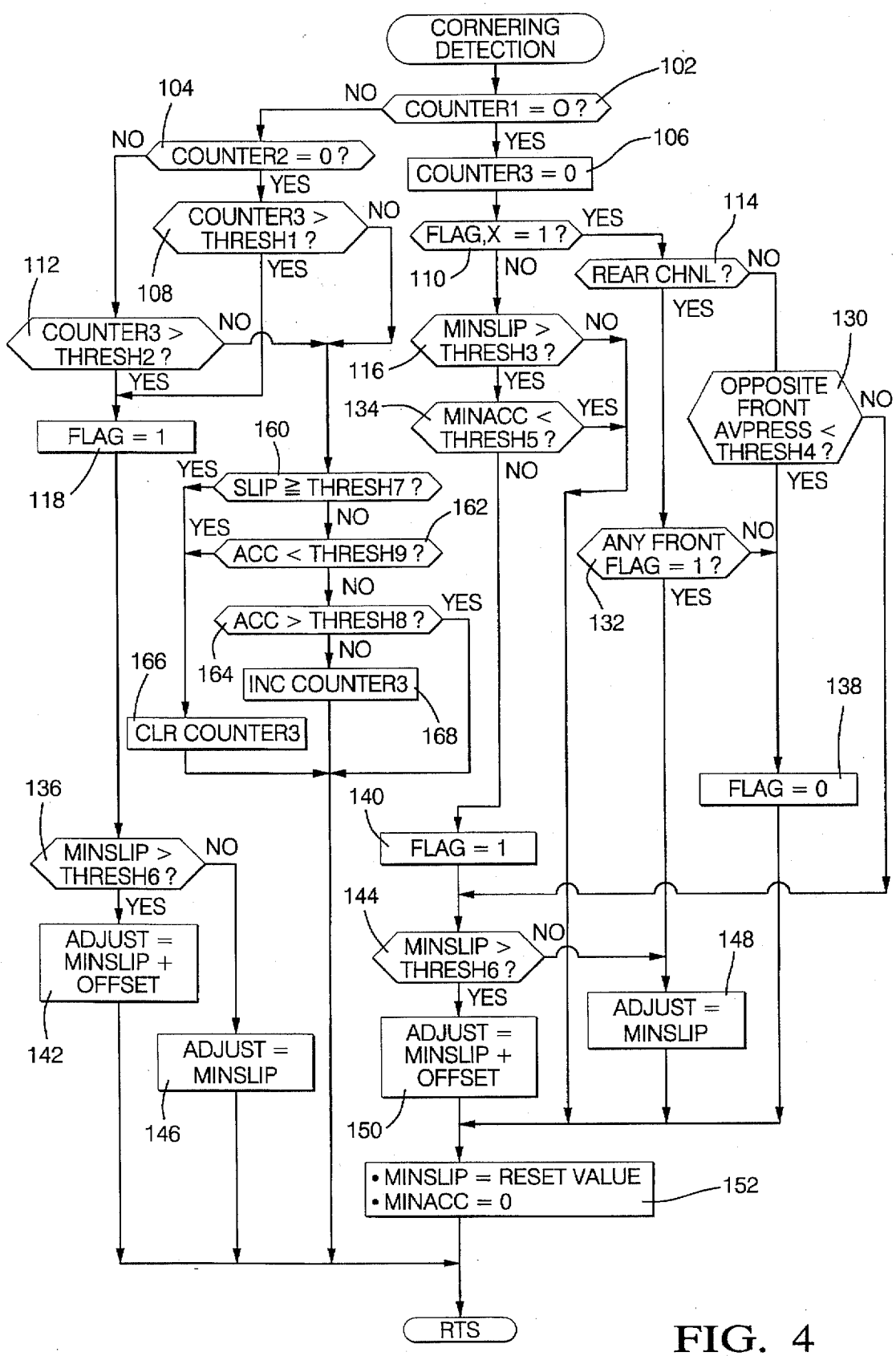
Figure 5:
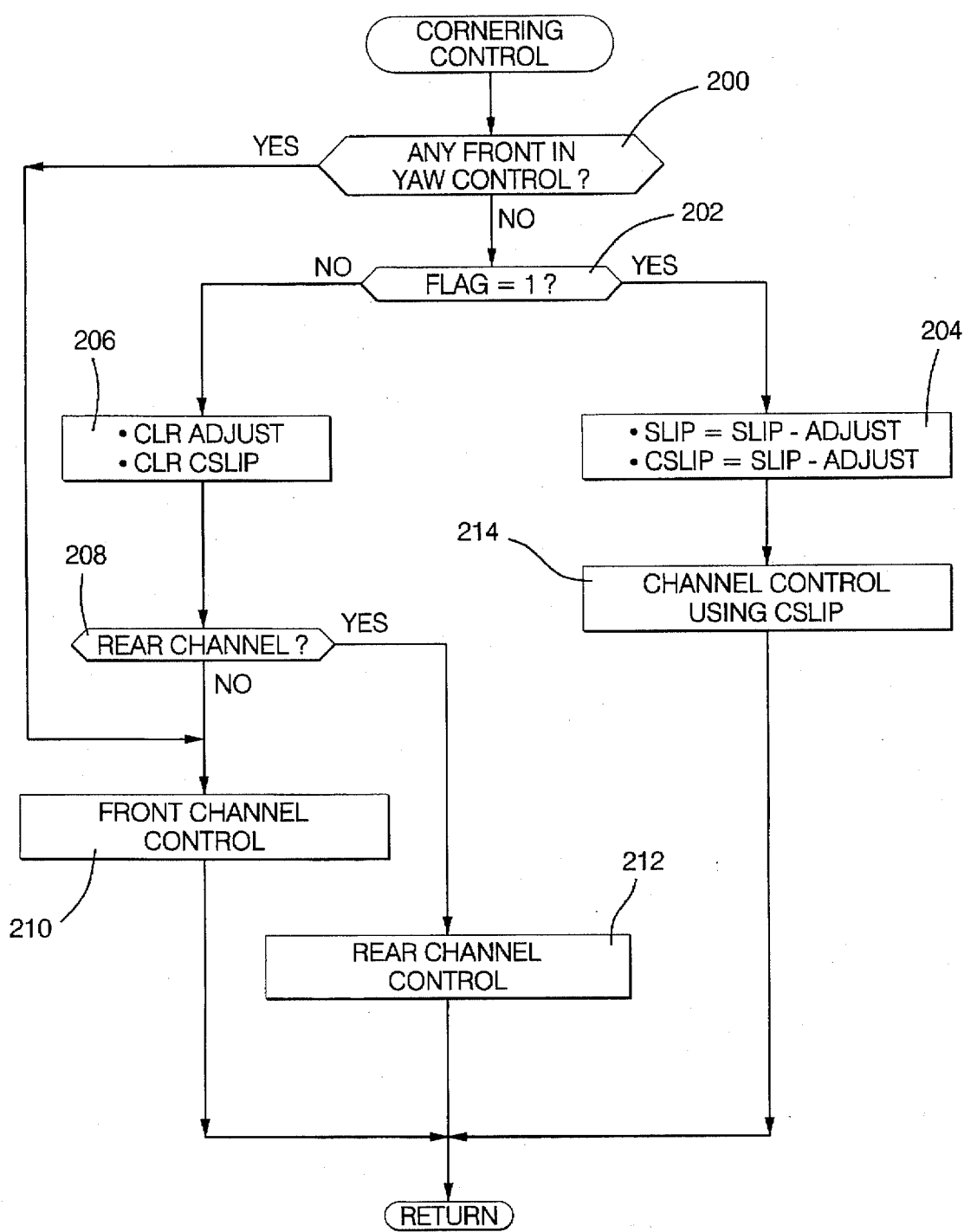

The operation of the electronic controller 38 in controlling the actuators 22, 24 and 62 in accordance with this invention is illustrated in FIGS. 3–5. The read-only memory of the microprocessor within controller 38 contains the instructions necessary to implement the algorithm as diagrammed in those figures.

Referring first to FIG. 3, when power is first applied to this system from a vehicle battery such as when a conventional vehicle ignition switch (not illustrated) is rotated to its "on" position, the computer program is initiated at a point 78 and then provides for system initialization at step 79, which entails clearing registers, initializing various RAM variables to calibrated values and other functions. When the initialization routine is completed, the program then proceeds to perform antilock brake control functions as required. These antilock control functions are performed by executing a control cycle in response to each of repeated control cycle interrupts that are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 82 (i.e., by differentiating the wheel speed information) and the individual wheel slip values at step 84. From the computed values of wheel acceleration and wheel slip, the program determines at step 86 whether or not those parameters represent the need for antilock brake pressure modulation for any wheel. The criteria used by the program to determine whether or not the controller should enter or exit ABS control of a particular wheel is well known to those skilled in the art and need not be set forth in detail herein.

If antilock control of wheel brake pressure is not required, the program proceeds to perform background tasks and/or other control functions not related to this invention at step 90. These tasks may include diagnostic functions as well as other functions. However, if step 86 determines that a need for antilock brake pressure modulation for any wheel is required, the program proceeds to a step 88 where antilock brake control functions are executed. Once those functions are executed, the program proceeds to the step 90 previously described.

The foregoing steps 80 through 90 are repeated once for each control cycle. Thus, when a control cycle interrupt occurs, a new cycle begins at step 80 and the functions represented by steps 80 through 90 are again repeated as previously described. Repeated executions of step 88 when antilock brake control is required establishes the general brake cycle as previously described wherein when the wheel slip and acceleration conditions represent an incipient wheel lockup condition, a pressure release mode is indicated and brake pressure is released to allow the wheel to recover from the incipient wheel lockup condition and when wheel acceleration and slip conditions represent a recovered condition, an apply mode is indicated and wheel pressure is reapplied and ramped until another incipient wheel lockup condition is sensed at which time the release mode is indicated and the cycle is repeated.

The apply and release mode control (block 88) are controlled largely in a manner known to those skilled in the art with the exception of the features according to this invention described below with reference to FIGS. 4–5. In performing the antilock brake control functions 88 the routine performs the functions shown in figures 4–5 to monitor and adjust the vehicle wheel slip according to this invention and then continues to perform conventional actuator control to implement ABS using the adjusted wheel slips determined according to this invention.

More particularly, according to this invention, the controller monitors three primary variables to achieve the desired control. The first primary variable, COUNTER3, indicates the number of consecutive control loops that the wheel being controlled passes a test indicating that the wheel speed is affected by a cornering maneuver. This cornering test is passed when the calculated wheel slip is greater than a predetermined threshold (THRESH7) and when the calculated wheel acceleration is between predetermined high and low thresholds (THRESH8 and THRESH9). If the value of COUNTER3 is above one threshold (THRESH1), the vehicle is in a cornering maneuver and the wheel slip is adjusted on the first ABS cycle. If the value COUNTER3 is not above THRESH1 during the first ABS cycle, but rises above another threshold (THRESH2) during subsequent ABS cycles, the vehicle is in a cornering maneuver and wheel slip is adjusted.

The second and third primary variables monitored by the routine are MINSLIP and MINACC, the minimum wheel slip and minimum wheel acceleration from the previous ABS cycle, respectively. If the minimum wheel slip from the previous ABS cycle and the minimum wheel acceleration from the previous ABS cycle are above separate predetermined thresholds, THRESH3 and THRESH5, respectively, then an error in steady state wheel slip is detected and the wheel slip is responsively adjusted.

In the illustrated example, the mount of the adjustment to the wheel slip is one of two possible values. The wheel slip is adjusted by the first value, the minimum slip from the previous ABS cycle, when the minimum slip from the previous ABS cycle is below a predetermined threshold (THRESH6). The wheel slip is adjusted by the second value, the sum of the minimum slip from the previous ABS cycle and a predetermined offset, when the minimum slip from the previous ABS cycle is above THRESH6. The specific values of the predetermined thresholds (i.e., THRESH1–9) described herein will vary from system to system with the dynamics of differing vehicle. Those skilled in the art can easily determine the values of those thresholds for a particular vehicle through simple design calibration on a test vehicle.

This example control according to this invention is carried out according to the steps illustrated in FIGS. 4–5 as follows. The routine for performing antilock brake functions (block 88, FIG. 3) starts and moves to block 102 where it compares COUNTER1, a counter representing the number of control loops of consecutive release mode operation, to zero. If COUNTER1 is equal to zero, the routine moves to block 106 where it sets COUNTER3, the counter representing the number of control loops that wheel acceleration is within cornering bounds, to zero. Block 110 then determines whether the slip adjustment flag, FLAG, is set. The slip adjustment flag is set when a slip adjustment according to this invention is being performed.

If the slip adjustment flag is set, the routine moves to block 114 where it determines if the wheel being checked is a rear wheel. If so the routine moves to block 132 where it determines if the slip adjustment flag for either of the front wheels is set. If the slip adjustment flag for either of the front wheels is set the routine moves to block 148, where it sets the value ADJUST, which is the amount of slip adjustment to be made, equal to MINSLIP, the minimum wheel slip from the previous ABS cycle.

The routine then moves to block 152 where it sets MINSLIP equal to its reset or initialization value (i.e., in one example the reset value for MINSLIP may be its maximum available value) and sets MINACC, the minimum wheel acceleration from the previous ABS cycle, to zero. The wheel slip adjustment subroutine is then exited.

If at block 114, the wheel being checked is not a rear wheel, then it must be a front wheel and the routine moves to block 130 where it compares AVPRESS, the average value of maximum brake pressures reached during previous ABS release and apply cycles for this brake event before pressure release cycle initiation, for the opposite front wheel, to THRESH4, the pressure threshold for low coefficient surface detection. If AVPRESS is less than THRESH4, the routine moves to block 138. The routine also moves to block 138 if, at block 132, none of the front slip adjustment flags are set. Block 138 resets the slip adjustment flag for the wheel being processed. From block 138 the routine continues to block 152 described above.

If at block 130, AVPRESS is not less than THRESH4, the routine continues to block 144, where the value MINSLIP, is compared to THRESH6, a threshold above which the slip adjustment is increased by OFFSET. If at block 144, MINSLIP is not greater than THRESH6, the routine continues to block 148, described above. If at block 144, MINSLIP is greater than THRESH6, the routine moves to block 150, where ADJUST is updated to equal MINSLIP+OFFSET. The routine then continues to block 152.

If at block 110, the slip adjustment flag is not set, the routine moves to block 116 where it compares MINSLIP to THRESH3, a value used to check if MINSLIP is above the cornering threshold. If MINSLIP is not above the cornering threshold, the routine continues to block 152 and then exits. If at block 114, MINSLIP is above THRESH3, the routine moves to block 134 where it compares MINACC, the minimum wheel acceleration from the previous ABS cycle, to THRESH5, a value used to check if MINACC is above the cornering threshold. If MINACC is below THRESH5, the routine continues to block 152 and then exits.

If at block 134, MINACC is not less than THRESH5, the routine moves to block 140 where it sets the slip adjustment flag for that wheel and then continues to blocks 144 and 150 where the wheel slip adjustment ADJUST is updated if MINACC is above the threshold THRESH6 as described above.

If at block 102 the counter COUNTER1 is not equal to zero, the routine moves to block 104 where it compares the counter, COUNTER2, representing the number of ABS cycles for the present brake event, to zero. Note, a brake event begins when the vehicle operator depresses the brake pedal and ends when the vehicle operator releases the brake pedal. If COUNTER2 is equal to zero at block 104, the routine moves to block 108 where it compares the counter, COUNTER3, representing the number of control loops that wheel acceleration was within cornering bounds, to the value THRESH1. THRESH1 is used to check if COUNTER3 is above a mimimum value of control loops to allow slip error/cornering detection during the initiation period of the pressure release cycle. In this manner the routine determines whether the vehicle is in a cornering maneuver. In general, COUNTER3 is incremented each consecutive time that the vehicle slip is over a predetermined threshold when a cornering maneuver is detected.

If COUNTER3 is not greater than the value THRESH 1, the routine moves to block 160 where it compares the calculated wheel slip, SLIP, to the threshold THRESH7, used to determine whether a wheel is in or is about to be in a locked condition. If at block 160 the value SLIP is greater than or equal to the slip threshold THRESH7, the routine moves to block 166 where it resets COUNTER3 to zero and then exits. If at block 160 the value SLIP is not greater than or equal to THRESH7, the routine continues to block 162 where it compares the value ACC, representing the wheel acceleration as calculated each control loop, to the value THRESH9, which sets the lower bound of the calculated wheel acceleration during a release cycle in a cornering maneuver. If ACC is less than THRESH9, the routine continues to block 166. If ACC is not less than THRESH9, then the routine moves to block 164 where it compares ACC to THRESH8, the upper bound of calculated wheel acceleration during a release cycle in a cornering maneuver. If ACC is greater than the upper bound, then the routine exits. If at block 164 ACC is not greater than the upper bound, then the routine determines that the vehicle is in a cornering maneuver and continues to block 168 where COUNTER3 is incremented. The routine then exits.

Referring again to block 108, if COUNTER3 is greater than the value THRESH1, then the routine moves to block 118 where the adjust flag is set. The routine then moves to blocks 136, 142 and 146, which perform the same functions of blocks 144, 150 and 148, respectively. Block 136 compares the value MINSLIP to the threshold, THRESH6. Block 142 sets ADJUST equal to MINSLIP plus OFFSET if MINSLIP is above THRESH6 and block 146 sets ADJUST equal to MINSLIP if MINSLIP is not above THRESH6.

If at block 104 COUNTER2 is not equal to zero, the routine continues to block 112 where it compares COUNTER3, the number of control loops that the wheel acceleration is within cornering bounds, to THRESH2 which is used to check if COUNTER3 is above a minimum value of control loops to allow slip error cornering detection during pressure release cycle. If COUNTER3 is not greater than THRESH2, the routine continues to block 160, described above. If COUNTER3 is greater than THRESH2, the routine continues to block 118, also described above.

Referring now to FIG. 5, after completion of the routine shown in FIG. 4, the controller moves to block 200 where it checks to determine if the vehicle is implementing a yaw control with any of the front wheel brakes. If yaw control is active, then the wheel slip adjustments according to this invention are bypassed and the routine continues straight to block 210 where the front actuators are controlled in accordance with the yaw control. Since the yaw control function is not germane to this invention, it is not set forth in detail herein. Any known or new yaw control may be used and block 200 is illustrated only to show that it is contemplated that, during yaw control events, implementation of the adjusted wheel slip according to this invention may be bypassed.

If there is no yaw control of the front wheels at block 200, the routine moves to block 202 where it checks the slip adjustment flag for that wheel. If at block 202 the slip adjustment flag is not set, the routine continues to block 206 where the variables ADJUST and CSLIP, representing the corrected slip value, are reset to zero. The routine then moves to blocks 208, 210 and 212 where the front and rear channel controls are implemented in a known manner.

If at block 202 the slip adjustment flag is set, the routine continues to block 204 where it sets the two values, SLIP and CSLIP, both equal to SLIP minus ADJUST. The routine then continues to block 214 where it implements the same conventional channel control implemented at blocks 210 and 212 except that the value CSLIP is used in the pressure release and apply control as opposed to the conventionally calculated value of wheel slip.

In the above manner, the ABS control is achieved reflecting the adjustments in slip implemented in accordance with this invention. During the channel controls, the calculated values of SLIP, ACC and maximum wheel pressure are monitored and the values MINSLIP, MINACC and the average maximum pressure are updated for use by this invention as described above with reference to FIG. 4. More particularly, during each pressure release and apply cycle, the computed slip value is compared to the value MINSLIP for that cycle and the value MINSLIP is updated to equal the computed slip value if the computed slip value is less than the present value of MINSLIP. MINACC is updated in the same manner. The average maximum pressure is kept as a running average of the peak pressures reached during each apply cycle during a brake event.

The embodiments of this invention in which an exclusive property or privilege is claimed are defined as follows:

1. A brake system control for use in a vehicle that calculates a wheel slip for at least one wheel, wherein the brake system control comprises the steps of:

monitoring the calculated wheel slip;

imposing a discriminating criteria on the monitored wheel slip wherein the discriminating criteria determines whether or not the calculated wheel slip accurately reflects an actual operating condition of the wheel;

implementing ABS control using an adjusted wheel slip for the wheel when the discriminating condition determines that the calculated wheel slip does not accurately reflect an actual operating condition of the wheel; and implementing ABS control utilizing the calculated wheel slip when the discriminating condition determines that the calculated wheel slip accurately reflects an actual operating condition of the wheel.

2. A brake system control according to claim 1 wherein the step of imposing a discriminating criteria on the monitored wheel slip comprises the substeps of monitoring the wheel slip during a release and an apply of brake pressure during an antilock brake control operation of the wheel;

monitoring a wheel acceleration during the release and apply;

determining a minimum wheel slip during the release and apply;

determining a minimum wheel acceleration during the release and apply;

comparing the minimum wheel slip to a first predetermined threshold;

comparing the minimum wheel acceleration to a second predetermined threshold; and determining that the calculated wheel slip does not accurately reflect the actual operating condition of the wheel if the minimum wheel slip is greater than the first predetermined threshold and if the minimum wheel acceleration is greater than the second predetermined threshold.

3. A brake system control according to claim 2, also comprising the step of:

adjusting the wheel slip by a value equal to the minimum wheel slip responsive to a determination that the calculated wheel slip does not accurately reflect the actual operating condition of the wheel.

4. A brake system control according to claim 3, wherein the step of adjusting the wheel slip by a value equal to the minimum wheel slip is carried out when the minimum wheel slip is below a third predetermined threshold.

5. A brake system control according to claim 2, also comprising the step of adjusting the wheel slip by a value equal to a sum of the minimum wheel slip and a predetermined offset responsive to a determination that the calculated wheel slip does not accurately reflect the actual operating condition of the wheel.

6. A brake system control according to claim 5, wherein the step of adjusting the wheel slip is carried out when the minimum wheel slip is above the third predetermined threshold.

7. A brake system control according to claim 1 wherein the step of imposing a discriminating criteria on the monitored wheel slip comprises the substeps of:

monitoring the wheel slip during an anti-lock brake control operation of the wheel;

monitoring a calculated wheel acceleration during the anti-lock brake control operation of the wheel;

comparing the wheel slip to a first predetermined threshold;

comparing the wheel acceleration to second and third predetermined thresholds;

determining that the calculated wheel slip does not accurately reflect the actual operating condition of the wheel if the wheel slip is above the first predetermined threshold and the wheel acceleration is between the second and third predetermined threshold for a predetermined time period during the ABS operation.

* * * * *